United States Patent [19]

Tomori

[11] 4,333,712
[45] Jun. 8, 1982

[54] CHANGE-OVER DEVICE FOR ZOOM LENS

[75] Inventor: Yasumasa Tomori, Sakada, Japan

[73] Assignee: Asahi Kogaku Kogyo Kabushiki Kaisha, Tokyo, Japan

[21] Appl. No.: 136,211

[22] Filed: Apr. 1, 1980

[30] Foreign Application Priority Data

Apr. 16, 1979 [JP] Japan .................................. 54/46513

[51] Int. Cl.³ .............................................. G02B 7/10
[52] U.S. Cl. ................................................. 350/430
[58] Field of Search ..................................... 350/430

[56] References Cited

U.S. PATENT DOCUMENTS

| | | | |
|---|---|---|---|
| 3,884,555 | 5/1975 | Suwa et al. | 350/428 |
| 3,972,056 | 7/1976 | Tsujimoto et al. | 350/430 |
| 4,089,590 | 5/1978 | Sakata | 350/430 |
| 4,114,984 | 9/1978 | Muryoi | 350/430 |

Primary Examiner—Jon W. Henry
Attorney, Agent, or Firm—Sughrue, Mion, Zinn, Macpeak and Seas

[57] ABSTRACT

A zoom lens including a change-over device or mechanism for changing between a normal photographing mode and a macro photographing mode and in which zooming and focusing operations for normal photographing are carried out with a single operational barrel while focusing and zooming for the macro photographing mode are carried out with a second or macro photographing operational barrel. A change-over rod is slidably mounted on a support barrel which supports each of four lens groups. The change-over rod is selectively engageable and disengageable from the normal operational barrel and a macro operational barrel. When the change-over rod is engaged with the normal operational barrel for macro photographing, rotation of the normal operational barrel is prevented and each of the lens groups are moved integrally with one another. In the other position of the change-over rod in which the end thereof is disengaged from the normal operational barrel, focusing and zooming are carried out by operating the normal operational barrel.

5 Claims, 6 Drawing Figures

CHANGE-OVER DEVICE FOR ZOOM LENS

BACKGROUND OF THE INVENTION

1. Field of the Invention

The present invention relates to a change-over device for changing between a normal photographing position or mode and a macro photographing position of mode for a zoom lens in which zooming operations and focusing operations are both carried out using a single operational barrel of an optical system in which each lens group of the optical system is moved in the macro photographing mode with the spacing between the respective groups being maintained constant.

2. Description of the Prior Art

At the time of change over to macro or close-up photographing, the distance to an object whose focused image is formed on the image plane of the overall optical system remains constant. However, the following points should be taken into consideration in the design of a change-over device. In prior art lens systems of this genaral type, if the focusing operation were to be carried out up to the minimum possible photographing distance to the object, either desirable macro photographing characteristics are not attainable or a desirable image magnification factor is not obtainable. Moreover, it is not possible upon change over to the macro photographing mode to utilize the photographing distance scale provided on the operational barrel. Instead, it is necessary to visually estimate the distance to the object. As the photographic image magnification factor is predetermined, photographing must be carried out according to the image magnification scale indicated on the outside of the lens.

Accordingly, in such a lens, if change over to macro photographing is permitted irrespective of the focusing position of the operational barrel, it is impossible to provide an indication of the distance range for macro photographing on the outside of the lens barrel. For this reason, it is necessary to view a desired image through a camera finder while manually operating the focusing adjustment. This results in poor operationability of the lens.

SUMMARY OF THE INVENTION

In view of the above-noted defects, an object of the present invention is to provide a lens and change-over device in which the focusing position at which change-over to the macro photographing region is permitted is limited to the minimum distance focusing position of a normal operational barrel which also serves as a zooming barrel. Furthermore, it is an object to the invention to provide such a change-over device in which, after change-over to the macro photographing mode, the focusing operation of the normal operational barrel which serves as the zooming barrel is disabled. Yet further, it is an object of the invention to provide such a change-over device having a separate member, a macro range focusing barrel, for performing the focusing operation in the macro range to thereby enhance the operationability in the macro range.

These and other objects of the present invention are achieved by providing a zoom lens of a type in which a zooming operation is carried out by the straight movement of a single normal operational barrel along the optical axis and a focusing operation is carried out by a front lens group through rotation of the single normal operational barrel around the optical axis including a change-over device for changing between a normal mode and a macro photographing mode having a second focusing operational barrel for macro photographing and a change-over rod slidably mounted on a support barrel supporting all the lens groups wherein, at a predetermined focusing position in the normal photographing mode, the change-over rod is selectively engageable with or disengageable from the normal operational barrel and the second focusing operational barrel and, when the change-over rod is engaged with the normal operational barrel, rotation of the normal operational barrel is prevented by the second focusing operational barrel and all of the lens groups are moved integrally with the spacings between the lens groups maintained constant for the macro photographing mode.

Preferably, a zoom lens according to the present invention includes a first lens group, an associated focusing barrel for supporting the first lens group in order to vary the focusing distance to the object, a second lens group, an associated first moving barrel for supporting the second lens group and for moving relatively long distances for normal zooming, a third lens group, an associated second moving barrel for supporting the third lens group and for moving relatively short distances for normal zooming, a fourth lens group, a support barrel for directly supporting the fourth lens group threadedly engaged with an operational barrel and movable only in the axial direction, a normal operational barrel serving for both focusing and zooming operations and provided with a slot in the axial direction thereof, the slot slidably receiving a first pin rigidly coupled to the focusing barrel, a sliding barrel movable with the operational barrel only in the axial direction and rotatable independently thereof, a second pin rigidly coupled to the first movement barrel and disposed in a first cam groove formed in the second moving barrel, in a slot formed in the axial direction in said support barrel, and also in an aperture provided in the sliding sleeve surrounding the outer periphery of the support barrel, a third pin rigidly coupled to the second moving barrel and engaged with the support barrel through a second cam groove formed in the support barrel, a mount barrel for attaching the lens to a mount portion of a camera body, and a macro operational sleeve supporting the support barrel by screw thread engagement therewith. The change-over device includes a change-over rod movable in the axial direction and prevented from rotating around the optical axis by the support barrel, the change-over rod moving from a first position where the macro operational sleeve is attached to the support barrel to a second position where the macro operational sleeve is freely rotatable within a predetermined range, and a cooperating sleeve having coupled thereto a fourth pin engaged with an axial groove formed in the operational barrel and rotatable together therewith and having an apertured portion at a predetermined position of the cooperating sleeve extending forwardly from a rear edge thereof adapted for receiving an end portion of said change-over rod.

DESCRIPTION OF THE PREFERRED EMBODIMENTS

Figure 1:
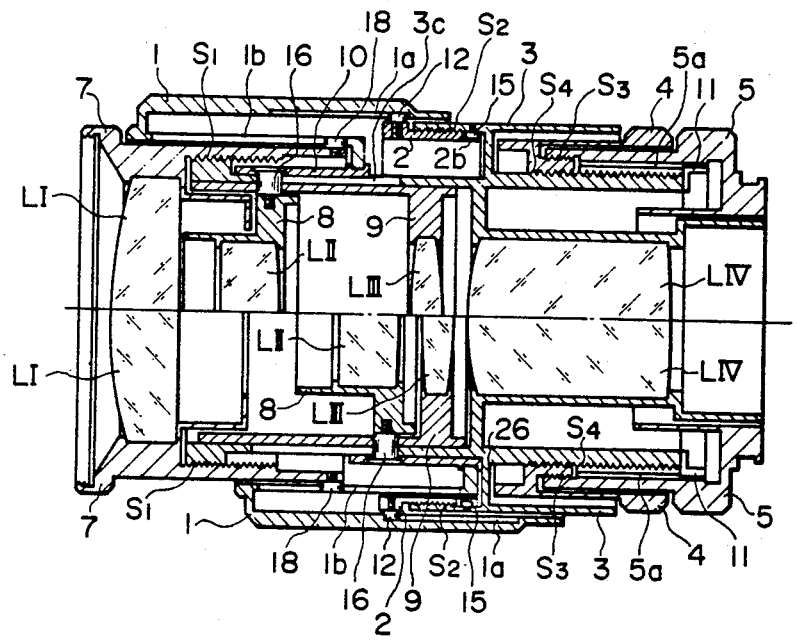
FIG. 1 is a cross-sectional view of a preferred embodiment of a zoom lens constructed in accordance with the present invention in which the minimum focal length zooming position is illustrated in the upper half of the figure and the maximum focal length zooming position is illustrated in the lower half at the infinite focusing distance photographing position.

The present invention will hereinafter be described with reference to the accompanying drawings. In a preferred embodiment shown, a zoom lens optical system is composed of a first lens group $L_I$, a second lens group $L_{II}$, a third lens group $L_{III}$ and a fourth lens group $L_{IV}$. Zooming is achieved by holding the first and fourth lens groups $L_I$ and $L_{IV}$ at constant positions and moving the second and third lens groups $L_{II}$ and $L_{III}$ relative thereto. Focusing is achieved by moving only the first lens group $L_I$. Macro photographing adjustment is achieved by moving all the lens groups irrespective of the zooming position.

Reference numeral 1 denotes a normal operational barrel, hereinafter referred to simply as the "operational barrel", which for the zooming operation moves along the optical axis and for the focusing operation rotates around the optical axis. Reference numeral 2 denotes a cooperating sleeve which is rotated through the same angle as the operational barrel during focusing by engagement of a cooperating pin 12 rigidly coupled thereto in a guide groove 1a formed in the operational barrel 1 parallel to the optical axis. Reference numeral 3 designates a support barrel which supports the overall optical system. The cooperating sleeve 2 is freely rotatable and coaxially supported by the support barrel through threaded engagement of a screw thread $S_2$. The cooperating sleeve 2 is limited in its rotation range by a limit pin 15 rigidly coupled to the support barrel 3 and a limit groove 2b formed in the cooperating barrel 2. Reference numeral 4 denotes a macro range focusing operational sleeve (hereinafter referred to simply as the "macro operational sleeve") which is coupled to the support barrel 3 through threaded engagement of a helicoid screw thread $S_4$. Reference numeral 5 designates a mount barrel having a mount portion for attachment to and detachment from a camera body (not shown). The mount barrel 5 rotatably supports the macro operational sleeve 4 through threaded engagement of a screw thread $S_3$. A guide key 11 integrally connected to the support barrel 3 is engaged with a guide groove 5a formed in the mount barrel 5 extending parallel to the optical axis whereby the support barrel 3 can be moved along the optical axis without rotation around the optical axis.

Reference numeral 6 denotes a change-over rod to which a change-over pin 13 is rigidly coupled. The change-over pin 13 has a neck portion which extends through a limit groove 3b formed in the support barrel 3 extending in the direction of the optical axis. The front end portion of the change-over rod is disposed through a retaining hole 3a. The change-over rod 6 can move only in the direction of the optical axis along the support barrel 3. A retaining projection 6b extending inwardly from the change-over rod 6 is engaged with a stopper groove 4a formed in the macro operational sleeve 4 except in the macro photographing mode to thereby prevent the relative rotation of the macro operational sleeve 4. A groove or apertured portion 2a, the position of which determines whether a change-over to the macro photographing mode is possible, is formed in the cooperating sleeve 2 and cooperates with the operational barrel 1 so that, when the operational barrel 1 is positioned at the minimum photographing distance, the stopper groove 2a confronts a stopper projection 6a formed at the front end of the change-over rod 6.

Reference numeral 7 designates a focusing barrel supporting the first lens group $L_I$ and coaxially supported by the support barrel 3 through threaded engagement of the helicoid screw portion $S_1$. A guide pin 18 rigidly coupled to the focusing barrel 7 is disposed in a guide groove 1b formed in the operational barrel 1 extending parallel to the optical axis thereby causing the focusing barrel 7 to rotate with the same amount of angular rotation as the operational barrel 1. Reference numeral 8 denotes a first moving barrel supporting the second lens group $L_{II}$. A guide pin 16 rigidly coupled thereto is disposed in a guide groove 3c formed in the support barrel 3 extending parallel to the optical axis which thereby limits the rotation of the first movement barrel 8 around the optical axis while permitting it to slide back and forth along the support barrel 3.

Reference numeral 9 designates a second moving barrel supporting the third lens group $L_{III}$ and which is slidably disposed inside the support barrel 3. The guide pin 16 is disposed in a lead groove (not shown) formed in the second moving barrel 9. Through these, when the first moving barrel 8 moves in the direction of the optical axis, the second moving barrel 9 rotates around the optical axis. A guide pin 17 rigidly coupled to the second moving barrel 9 engages a cam groove (not shown) formed in the support barrel 3. Accordingly, the position of the third lens group is determined by rotation of the second moving barrel 9. Reference numeral 10 designates a sliding sleeve slidably disposed around the support barrel 3 and to which is attached the guide pin 16 rigidly coupled to the first moving barrel 8 and supporting the operational barrel 1 which is allowed to rotate freely therearound. Reference numeral 14 denotes a limit pin rigidly coupled to the mount barrel 5 and engaging a limit groove 4b formed in the macro operational sleeve 4 to thereby limit the macro photographing range of the macro operational sleeve 4.

Figure 2:
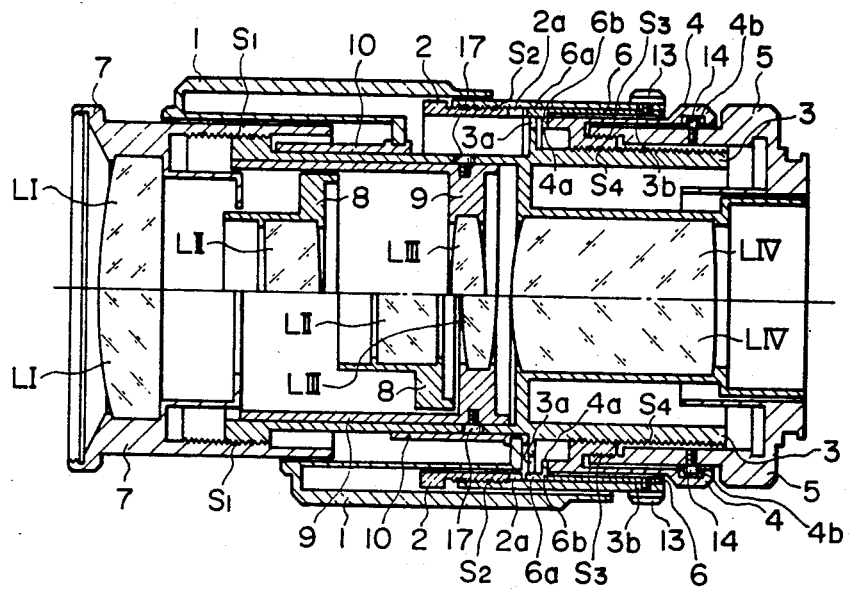
FIG. 2 is a cross-sectional view of the lens FIG. 1 in which the minimum focal length zooming position is illustrated in the upper half of the figure and the maximum focal length zooming position is illustrated in the lower half at the minimum focusing distance photographing position in the same manner as in FIG. 1.
Figure 4:
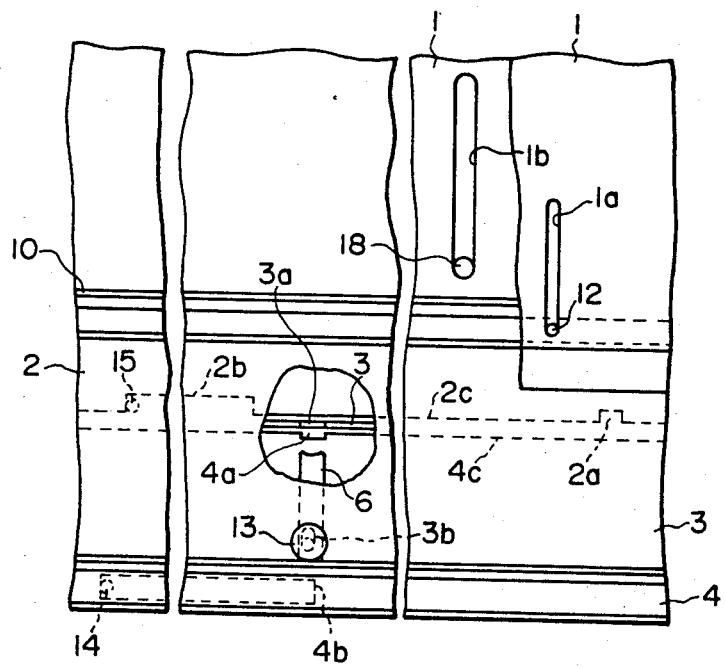
FIG. 4 is an exploded view of primary parts of the embodiment at the minimum focal length zooming position and the infinite focusing distance photographing position.
Figure 5:
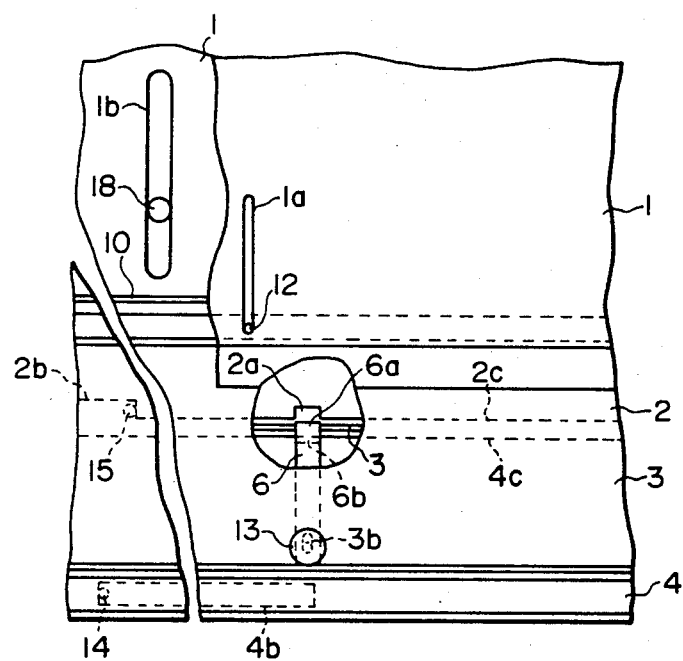
FIG. 5 is an exploded view of the primary parts of the embodiment at the minimum focal length zooming position and the minimum focusing distance photographing position.

With such a construction, when the operational barrel 1 is rotated from the infinite focusing distance photographing position shown in FIG. 1, which represents the minimum focal length zoom position in the upper half and the maximum focal length zoom position in the lower half, to the minimum focusing distance photographing position, the lens system reaches the state shown in FIG. 2 which represents the minimum focal length zooming position in its upper half and the maximum focal length zooming position in its lower half. FIGS. 4 and 5 are exploded views showing primary parts of the lens system at the minimum focal length zooming positions of FIGS. 1 and 2, respectively.

The change from the position shown in FIG. 1 to the position shown in FIG. 2 will be explained. In FIG. 4, showing the minimum focal length zooming position and the infinite focusing distance photographing position, the operational barrel 1 is rotated from the right to the left. With this operation, the focusing barrel 7 is rotated around the optical axis by the engagement between the guide pin 18 and the guide groove 1b while at the same time it is moved from the right to the left in FIG. 1 by the helicoid screw thread $S_1$ and in the upward direction in FIG. 4. The cooperating sleeve 2 is, in the same manner as the operational barrel 1, rotated from the right to the left in FIG. 4. Upon further rotation of the operational barrel 1, the limit groove 2b moves from abutment with the limit pin 15 at its left end as seen in FIG. 4 to the minimum focusing distance photographing position shown in FIG. 5 with the limit pin 15 in abutment with the limit pin 2b at its right end. Simultaneously, the retaining groove 2a is moved from the position shown in FIG. 4 to that of FIG. 5 where it confronts the end projection 6a of the change-over rod 6. From the position shown in FIG. 4 until just before the retaining groove 2a reaches the position shown in FIG. 5, disengagement of the projection 6a of the change-over rod 6 from the stopper groove 4a is prevented by the limit end wall 2c of the cooperating sleeve 2 thereby preventing the rotation of the macro operational sleeve 4.

In FIG. 5, which shows a state in which a change-over to the macro photographing is possible, when the change-over pin 13 is manually moved upwardly, the change-over rod 6 moves to the same extent and the end projection 6a thereof moves into the retaining hole 3a while simultaneously the projection 6b is disengaged from the stopper groove 4a. Upon such an operation, rotation of the cooperating sleeve 2 is prevented as is rotation of the operational barrel 1 at the minimum focus distance photographing position while it is possible then to manually rotate the macro operational sleeve 4. That is, the macro operational sleeve 4 may be rotated from the right to the left in FIG. 5 whereby, due to the relationships among the screw threads $S_3$ and $S_4$, the guide groove 5a and the guide key 11, the support barrel 3 is straightly moved along the optical axis from the right to the left in FIG. 2. As a result, all four lens groups are moved from the right to the left while maintaining a constant interval between lens groups. From the position of FIG. 5, for the minimum focusing distance macro photographing position, the macro operational sleeve 4 is rotated until the right end of the limit groove 4b abuts against the limit pin 14. This position is shown in FIGS. 3 and 6.

Figure 3:
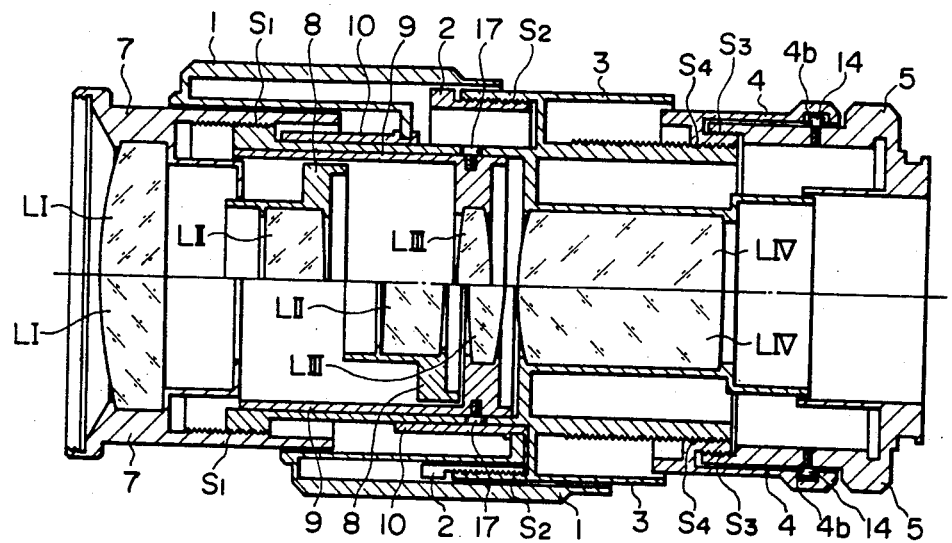
FIG. 3 is similar to FIG. 2 but shows the lens at the minimum macro photographing position.

FIG. 3 shows the minimum focal length zooming position in its upper half and the maximum focal length zooming position in its lower half. FIG. 6 illustrates the minimum focal length zooming position. For macro photographing, for any position except for the change-over position shown in FIG. 5, the projection 6b does not move the change-over pin 13 downwardly from the position shown in FIG. 6 relative to the limit end wall 4c, which is perpendicular to the optical axis, of the macro operational sleeve 4. As such, disengagement between the retaining groove 2a and the end projection 6a is prevented and the projection 6b cannot be inserted into the stopper groove 4a. Therefore, independent rotation of the operational barrel 1 is prevented and the rotational position of the macro operational sleeve 4 is maintained.

Figure 6:
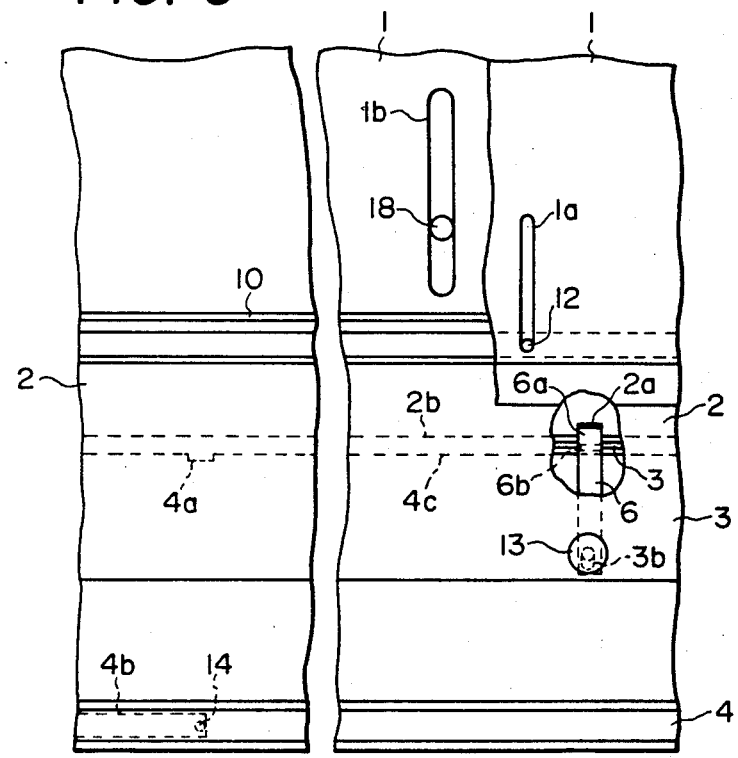
FIG. 6 is an exploded view of the primary parts of the embodiment at the minimum focal length zooming position and the minimum focusing distance macro photographing position.

To release the optical system from the macro photographing position, the macro operational sleeve 4 is moved from the left to the right in FIG. 6 until the limit groove 4b abuts against the limit pin 14 at its left end at which point the stopper groove 4a confronts the projection 6b. When the change-over pin 13 is moved downwardly to the position shown in FIG. 5, the projection 6b engages with the retaining groove 4a and, at the same time, the end projection 6a disengages from the stopper groove 2a whereupon rotation of the macro operational sleeve 4 is prevented and rotation of the operational barrel 1 is enabled. If the operational barrel 1 is rotated from the left in the state shown in FIG. 5 to the right and the left end of the limit groove 2b abuts against the stopper pin 15, the infinite focusing distance photographing position will be reached. In FIGS. 4, 5 and 6, the zoom position is at the minimum focal length. Should the operational barrel 1 be moved downwardly toward the position of maximum focal length, only the guide grooves 1a and 1b are moved downwardly while the change-over structure remains at the same position. Accordingly, even in the macro photographing mode, zooming is possible.

In the specific embodiment shown, the screw thread $S_2$ rotatably attaches the cooperating sleeve 2 to the support barrel 3. However, the screw threads may be omitted and the cooperating sleeve 2 may be supported by the support barrel 3 in such a manner that it is prevented from moving in the direction of the optical axis but is still rotatable. In the specific embodiment described, prevention of the operational barrel 1 from rotating around the optical axis is achieved via the cooperating sleeve 2 and the support barrel 3. However, it may be provided as well by cooperation between the operational barrel 1 and the sliding sleeve 10 which is limited in its rotation around the optical axis. Further, the zoom lens system in the preferred embodiment described includes four lens groups. However, any type of optical systems may be used so long as focusing is achieved by rotation of the operational barrel 1 around the optical system, the zooming operation is achieved by a straight movement along the optical axis, and a helicoid screw for macro photographing is provided between the member supporting the lens groups and the mount member. Since the focusing position indicating member, the groove 2a which determines when a change-over to the macro photographing position is possible may be formed at any position on the cooperating sleeve 2, it is possible to vary the change-over position from the minimum focusing distance photographing position as required.

As described above, according to the present invention, the change-over position at which change over to the macro photographing mode is possible is at a particular position of the focusing photographing range, the normal photographing operational barrel no longer is used for focusing after the change-over and the macro operational sleeve performs this function. Thus, the function of the operational barrel is made quite simple. Also, with the invention it is possible to provide both a photographing distance scale for the macro photographing mode and an image magnification scale for the zooming operation. Therefore, the operationability for macro photographing is enhanced considerably over prior art constructions.

What is claimed is:

1. A zoom lens, including a stationary lens mount for attachment to a camera, wherein a zooming operation is carried out by moving a single normal operational barrel along an optical axis and a focusing operation of a front lens group is carried out by the rotation of the single normal operational barrel around the optical axis, comprising:
    a plurality of lens groups including said front lens group for focusing and second and third lens groups for zooming;
    cooperating means for rotating said single normal operational barrel;
    a second focusing operational barrel for moving all of the lens groups for performing macro photographing operations;
    a support barrel for supporting said lens groups, said support barrel being movable along the optical axis but not rotatable around the optical axis; and
    a change-over rod slidably mounted on said support barrel, said change-over rod being axially movable between a first position and a second position, said change-over rod being selectively engageable and disengageable from said normal operational barrel and said second focusing operational barrel at a predetermined focusing position for normal photographing, said change-over rod being engaged with said normal operational barrel through said cooperating means at said first position, and said change-over rod being engaged with said second operational barrel at said second position, wherein at the first position, rotation of said normal operational barrel is prevented, each of said lens groups being integrally movable for macro photographing with one another with a spacing between said lens groups being maintained constant.

2. The zoom lens of claim 1, wherein said predetermined position for normal photographing is a minimum photographing distance position of said normal operational barrel.

3. A zoom lens comprising: a first lens group; a focusing barrel supporting said first lens group for varying the focusing distance of said lens group to an object; a first pin rigidly coupled to said focusing barrel; a second lens group, a first moving barrel supporting said second lens group and being adapted for moving in the axial direction of said lens for relatively long distances for normal zooming; a third lens group; a second moving barrel supporting said third lens group and being adapted for moving relatively short distances in said axial direction for normal zooming; a fourth lens group; a normal operational barrel for performing both focusing and zooming operations, said normal operational barrel being provided with a slot in the axial direction thereof, said slot slidably receiving said first pin; a support barrel directly supporting said fourth lens group and being threadedly engaged with said operational barrel and movable only in said axial direction; a sliding barrel movable with said operational barrel only in said axial direction and rotatable independently thereof, a second pin rigidly coupled to said first moving barrel and being disposed in a cam groove formed in said second moving barrel, in a slot formed in said axial direction in said support barrel and in an aperture formed in said sliding barrel surrounding the outer periphery of said support barrel; a third pin rigidly coupled to said second moving barrel and engaged with said support barrel through a second cam groove formed in said support barrel; a mount barrel adapted for attachment to a mount portion of a camera body; and a macro operational sleeve coupled to said support barrel through screw threads; a change-over rod movable in said axial direction and being prevented from rotating around said optical axis by said support barrel, said change-over rod being axially movable between a first position where said macro operational sleeve is connected to said support barrel to a second position where said macro operational sleeve is freely rotatable through a predetermined angular range; a cooperating sleeve having an apertured portion in a predetermined edge position thereof adapted to receive an end portion of said change-over rod; and a fourth pin rigidly coupled to said cooperating sleeve and engaged in an axial groove formed in said operational barrel to thereby rotate together therewith.

4. The zoom lens of claim 3 wherein said cooperating sleeve is attached to said support barrel by screw threads.

5. The zoom lens of claim 3 wherein said cooperating sleeve is rotatable around said support barrel but is prevented from moving in the direction of said optical axis.